US006702101B2

(12) United States Patent
Haruch et al.

(10) Patent No.: US 6,702,101 B2
(45) Date of Patent: Mar. 9, 2004

(54) BLOWER OPERATED AIRKNIFE WITH AIR AUGMENTING SHROUD

(75) Inventors: James Haruch, Naperville, IL (US); Wai Y. Leung, Chicago, IL (US); Emily Smith, Villa Park, IL (US); Timothy H. Hennessy, Plainfield, IL (US)

(73) Assignee: Spraying Systems Co., Wheaton, IL (US)

( * ) Notice: Subject to any disclaimer, the term of this patent is extended or adjusted under 35 U.S.C. 154(b) by 0 days.

(21) Appl. No.: 10/037,142

(22) Filed: Dec. 21, 2001

(65) Prior Publication Data

US 2003/0115709 A1 Jun. 26, 2003

(51) Int. Cl.$^7$ .................................... B65G 45/00

(52) U.S. Cl. .................... 198/495; 15/309.2; 15/306.1; 15/421

(58) Field of Search .................... 15/309.2, 309.1, 15/306.1, 300.1, 421; 198/494, 495

(56) References Cited

U.S. PATENT DOCUMENTS

| | | | | |
|---|---|---|---|---|
| 2,720,005 A | * | 10/1955 | Clark et al. | 264/518 |
| 3,984,898 A | * | 10/1976 | Matsumura et al. | 425/81.1 |
| 4,091,496 A | * | 5/1978 | Desrosiers et al. | 15/371 |
| 4,936,870 A | | 6/1990 | Baumann et al. | 48/197 R |
| 5,121,829 A | * | 6/1992 | Grannes et al. | 198/495 |
| 5,593,499 A | * | 1/1997 | Stans et al. | 118/63 |
| 5,794,304 A | * | 8/1998 | Ritter | 15/346 |
| 5,881,429 A | * | 3/1999 | Drewitz | 15/304 |
| 6,062,774 A | | 5/2000 | Fourcroy et al. | 406/197 |
| 6,151,798 A | * | 11/2000 | Petersen | 34/304 |
| 6,192,547 B1 | * | 2/2001 | Song | 15/308 |
| 6,228,216 B1 | * | 5/2001 | Lindsay et al. | 162/111 |
| 6,474,355 B1 | * | 11/2002 | Jirawat et al. | 15/1.51 |

* cited by examiner

*Primary Examiner*—Joseph A. Dillon
(74) *Attorney, Agent, or Firm*—Leydig, Voit & Mayer

(57) ABSTRACT

A low pressure blower operated airknife having a housing with an elongated primary air discharge orifice for directing a narrow width curtain of air. The airknife includes an air-augmenting shroud which defines auxiliary discharge orifices on opposite longitudinal sides of the primary air discharge orifice such that air discharging from the primary discharge orifice creates a low pressure condition adjacent the auxiliary air discharge orifices for drawing additional air through the auxiliary discharge orifices which augments the velocity and volume of the discharging air current without the necessity for increasing the air inlet pressure or blower size. The shroud may take alternative forms, including pairs of wings disposed on opposite sides of the primary discharge orifice or hollow structures that surround the airknife housing. The airknife further is adapted for low pressure direction and application of air laden particles, such as preatomized liquid particles.

30 Claims, 6 Drawing Sheets

BLOWER OPERATED AIRKNIFE WITH AIR AUGMENTING SHROUD

The present invention relates generally to blowers, and more particularly to a blower-operated airknife for directing an elongated narrow width curtain of air.

BACKGROUND OF THE INVENTION

Blower operated airknives are known for directing elongated air curtains for various purposes such as, for example, drying, cooling, or cleaning items conveyed transversely through the air curtain. Such airknives typically have a narrow elongated slit-like discharge orifice and are supplied with a low-pressure air that is channeled through the discharge orifice in a downwardly or outwardly directed curtain of air. From an economical standpoint, it is desirable to use relatively low-pressure blowers with such air knives, such as blowers that operate at pressures on the order of 5 psi. A problem with such low air pressure operated airknives is that the volume and velocity of the discharging air can be limited, which in turn can limit the effectiveness of the air curtain, including its effective transverse width, i.e. the width of the curtain in the direction of travel of items conveyed through the air curtain.

OBJECTS AND SUMMARY OF THE INVENTION

It is an object of the present invention to provide a blower-operated airknife that is adapted for more efficient operation.

Another object is to provide a blower operated airknife as characterized above that is effective for producing a significantly greater air flow for a given inlet air pressure. A related object is to provide such an airknife that is adapted to produce a higher volume and/or velocity air curtain without increasing the size or operating pressure of the associated blower.

A further object is to provide a low pressure blower operated airknife of the above kind that is adapted for producing a more effective, higher volume and/or velocity, air curtain with a greater width in the direction of travel of items passing through the air curtain.

Still another object is to provide an airknife of the foregoing type which is adapted for the low-pressure direction and application of air-laden particles, and particularly air curtains which carry and deposit pre-atomized liquid particles.

Other objects and advantages of the invention will become apparent upon reading the following detailed description and upon reference to the drawings, in which:

Figure 1:
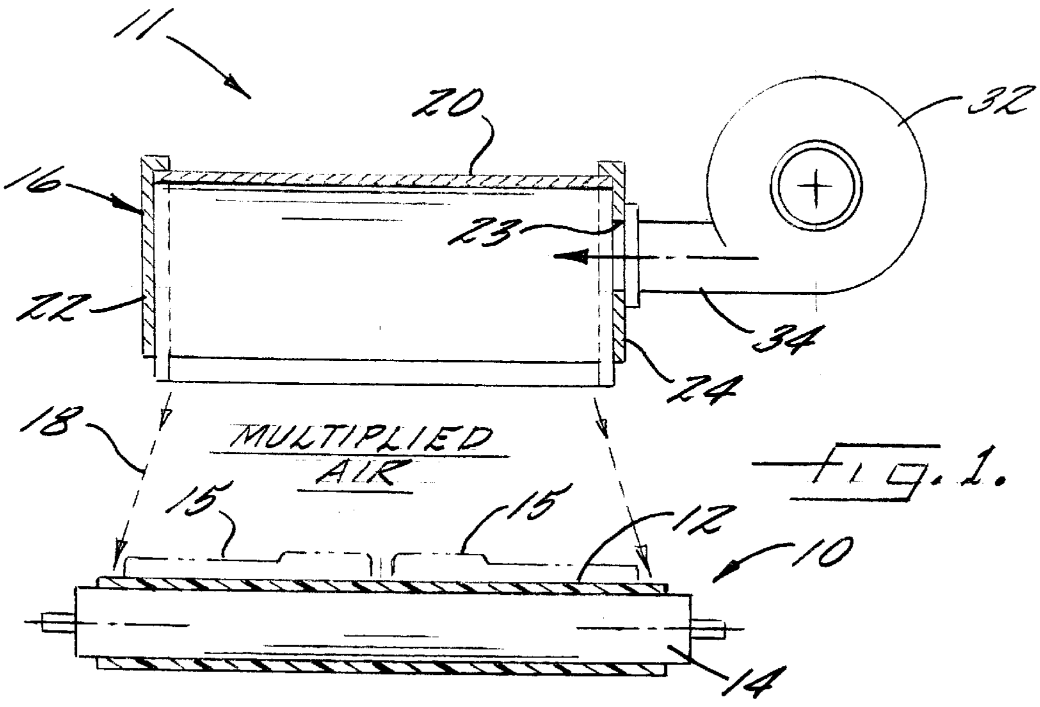
FIG. 1 is a partially diagrammatic depiction of a conveyor system having a blower operated air knife in accordance with the present invention.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENT

Referring now more particularly to FIG. 1 of the drawings, there is shown a conveyor 10 having an illustrative airknife 11 embodying the present invention. The conveyor 10 may be of a conventional type, having a belt 12 trained about rollers 14 for moving items 15 to be processed along a length of the conveyor 10. The airknife 11 includes an elongated housing 16 horizontally supported above the conveyor 10 for directing a relatively narrow width curtain 18 of air across the conveyor belt 12 transverse to the line of movement of the conveyed items. As is known in the art, air currents of such type may be used for various purposes in manufacturing processing, including, but not limited to, forced air drying, cleaning, or cooling of items as they are conveyed through the air curtain.

Figure 3:
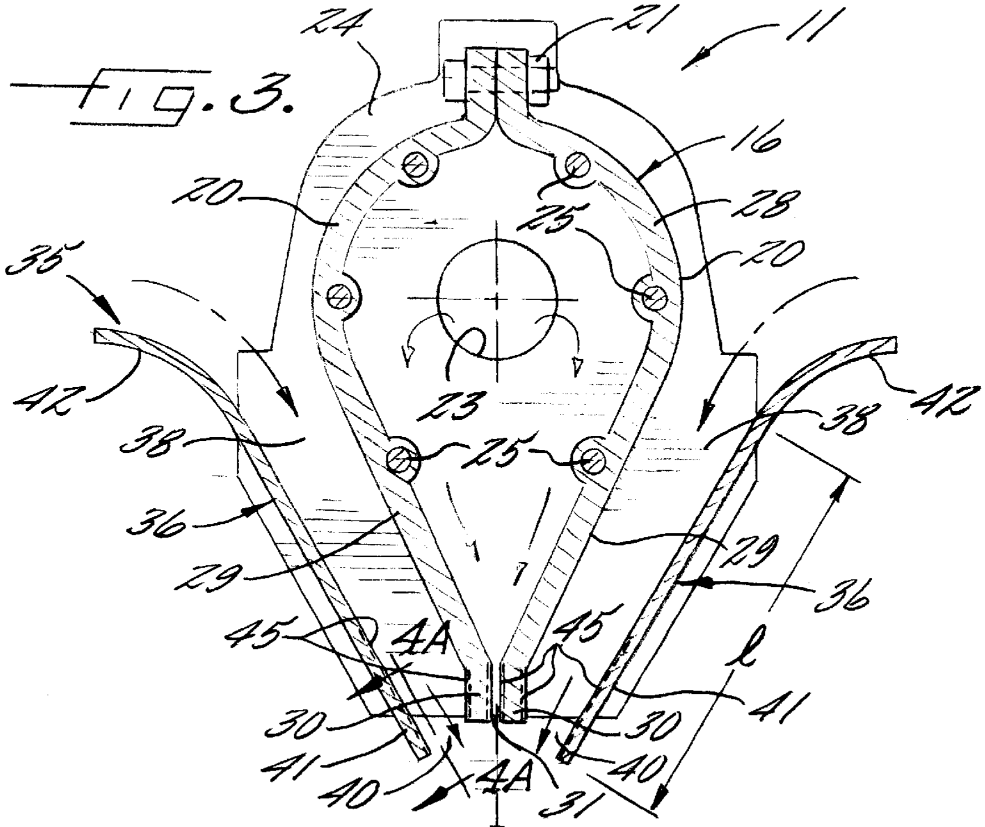
FIG. 3 is a vertical section of the illustrated airknife taken in the plane of line 3—3 in FIG. 2.
Figure 3A:
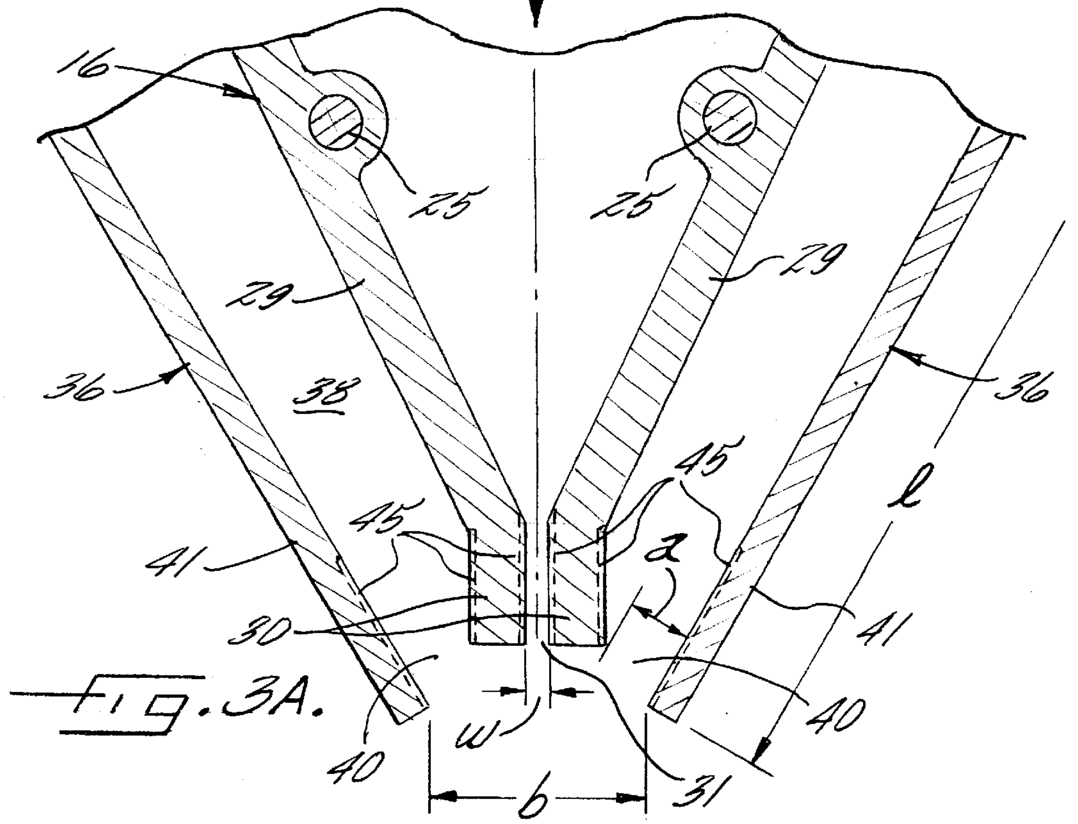
FIG. 3A is an enlarged fragmentary section of the discharge end of the illustrated airknife.

The elongated housing 16 of the illustrated airknife 11 is defined by a pair of identical side panels 20 secured by cross bolts 21 and forward and rear end panels 22, 24 respectively, secured at rearward and forward ends of the side panels 20 by longitudinally extending bolts 25 which extend through circumferentially spaced longitudinal passages in the side panels 20. The housing 16 has a pear-shaped cross section, as best depicted in FIG. 3, which includes a generally rounded upper proportion 28 and a downwardly directed tapered lower portion 29 having relatively straight wall sections. The lower tapered housing portion 29 terminates in a pair of downwardly directed plate or flange portions 30 disposed in closely spaced side-by-side relation to each other for defining an elongated slit-like primary air discharge orifice 31. The discharge orifice 31 preferably has a relatively narrow width "w", such as on the order of 0.042 inches.

For supplying low-pressure air to the housing 16, the airknife 11 has a blower 32 operable for directing air to the housing 16 via a supply conduit 34. The conduit 34 in this case communicates with an inlet aperture 23 in the upper rounded portion of the rear housing end panel 24. The blower 32 preferably is operable for directing an air supply to the housing 16 at relatively low pressures, such as less than 10 psi, and preferably about 5 psi. As is known in the art, low-pressure air directed to the housing 16 will exit the elongated discharge orifice 31 in a relatively narrow air curtain which extends across the conveyor belt 12 transversely to the direction of movement of items 15 being conveyed. While for economical reasons it is desirable to use low pressure blowers in such airknives, as indicated above, in conventional airknives, the air volume and/or velocity of the discharging air curtain, as well as its transverse width, may be limited such as to impede its effective use in some processing applications.

In accordance with the invention, the airknife includes an air-augmenting shroud adapted for increasing the airflow from the knife without the necessity for increasing the air inlet pressure or blower size. To this end, the illustrated airknife 11 has an air-augmenting shroud 35 defined by a pair of fins 36 mounted in predetermined spaced relation on opposite sides of the lower housing portion 29 for defining air passages 38 that communicate with respective elongated auxiliary air discharge orifices 40 parallel to and adjacent opposite sides of the primary discharge orifice 31. The fins 36, which may be inexpensively formed of plastic, in this instance each have a straight planar portion 41 which extends generally parallel to a respective tapered side of the airknife housing 16 and outwardly curved upper portion 42 flared away from the housing 16. For supporting the wings 36, the end panels 22, 24 extend outwardly of the housing side panels 20 and are formed with respective grooves for receiving and supporting the straight planar sections 41 of the wings 36 with a press fit. It will be seen that the wings 36 define the auxiliary air passages 38 along opposite tapered sides of the lower housing portion 29 and the auxiliary discharge orifices 40 are defined between the lower terminal ends of the wings 36 and housing flanges 30. The wings 36 preferably are supported such that the lower terminal ends extend a small distance below the lower ends of the housing flanges 30, such as about ⅛th inch.

In operation, air flow discharging from the primary discharge orifice 31 is believed to create a relatively lower atmospheric pressure condition in the vicinity of the auxiliary discharge orifices 40 defined by the shroud wings 36 so as to cause ambient air to be drawn through the auxiliary air passages 38 and discharge orifices 40 and be entrained with air emitting from the primary discharge orifice 31. This has been found to increase the volume and velocity of the discharging air flow and cause the air curtain to have a greater transverse width (i.e., in the direction of items traveling through the air curtain) for more effective processing usage.

The auxiliary air discharge orifices 40 defined by the shroud wings 36 have a width "a" greater than the width "w" of the primary discharge orifice. The auxiliary air discharge orifices 40 in this instance have a width "a" about three times the width "w" of the primary discharge orifice 31. Preferably, the auxiliary discharge orifices 40 having a width "a" of about $1/8^{th}$ inch and define an overall gap "b" of about ½ inch, which encompasses the discharge end of the airknife housing 16, and particularly the primary orifice-defining flanges 30. The auxiliary air passageways 38 defined by the shroud wings 36 preferably extend a length "1" of between about 6 to 9 inches, depending upon the size of the airknife housing 16.

Figure 4A:
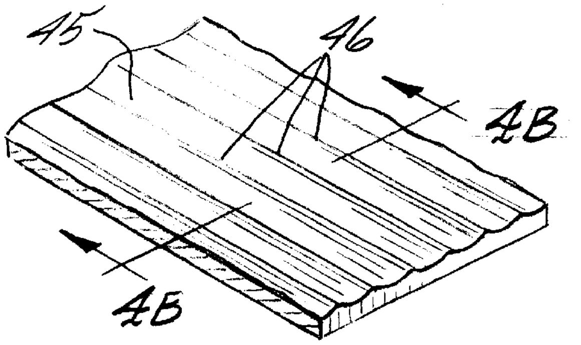
FIG. 4A is a fragmentary perspective depicting the textured surface of a plate that defines one of the air discharge orifices of the illustrative airknife, such as the plate surface as viewed in the plane of line 4A—4A in FIG. 3.
Figure 5A:
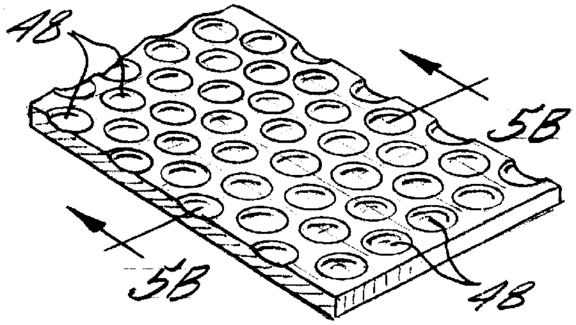
FIG. 5A is a fragmentary perspective, similar to FIG. 4A, depicting an alternative form of discharge orifice plate surface.
Figure 4B:
FIG. 4B is a vertical section of the plate shown in FIG. 4A, taken in the plane of line 4B—4B.
Figure 5B:
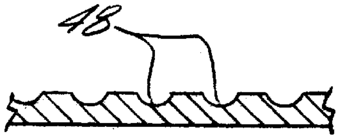
FIG. 5B is a vertical section of the plate shown in FIG. 5A taken in the plane of line 5B—5B.
Figure 6A:
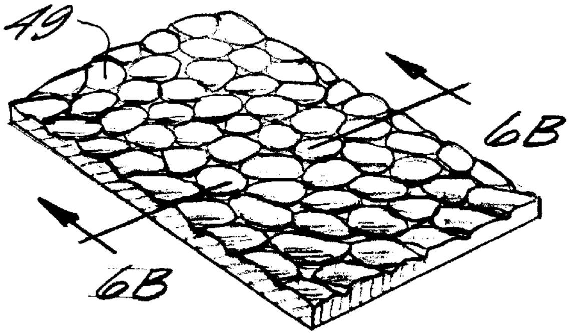
FIG. 6A is a fragmentary perspective, similar to FIGS. 4A and 5A, showing still another alternative form of discharge orifice plate surface.
Figure 6B:
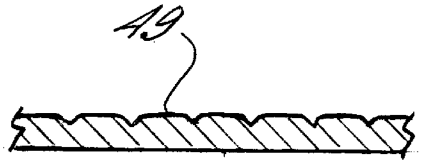
FIG. 6B is a vertical section of the plate shown in FIG. 6A, taken in the plane of line 6A—6A.

In keeping with the invention, the surfaces of the airknife 11 and shroud 35 that define the primary and auxiliary discharge orifices 31,40 are textured or otherwise irregular for reducing eddy current effects and further augmenting and enhancing the discharging airflow. In the illustrated embodiment, the terminal flanges 30 of the airknife housing 16 and lower inside faces of the wings 36 are formed with textured surfaces 45, such as the grooved surface depicted in FIGS. 4A and 4B. The textured surface 45 in this case is defined by a plurality of closely spaced riblets 46 extending in the air flow direction which create the irregular surface. Alternatively, the textured surface may be in the form of dimples 48, such as shown in FIGS. 5A and 5B, or a sharkskin or other pattern 49, such as illustrated in FIGS. 6A and 6B. Such texturing of the orifice-defining surfaces is believed to inhibit eddy currents that can create a drag on the airflows through the discharge orifices 31, 40. The texturing is believed to reduce the coefficient of drag, and hence, permit enhanced air flow. In practice, an airknife with such air augmenting shroud 35 has been found to significantly increase the volume and velocity of the discharging air flow by as much as 25%, without the necessity for increasing the blower size or supply air pressure. With the greater air flow, the effective transverse width of the air curtain also is increased.

Figure 7:
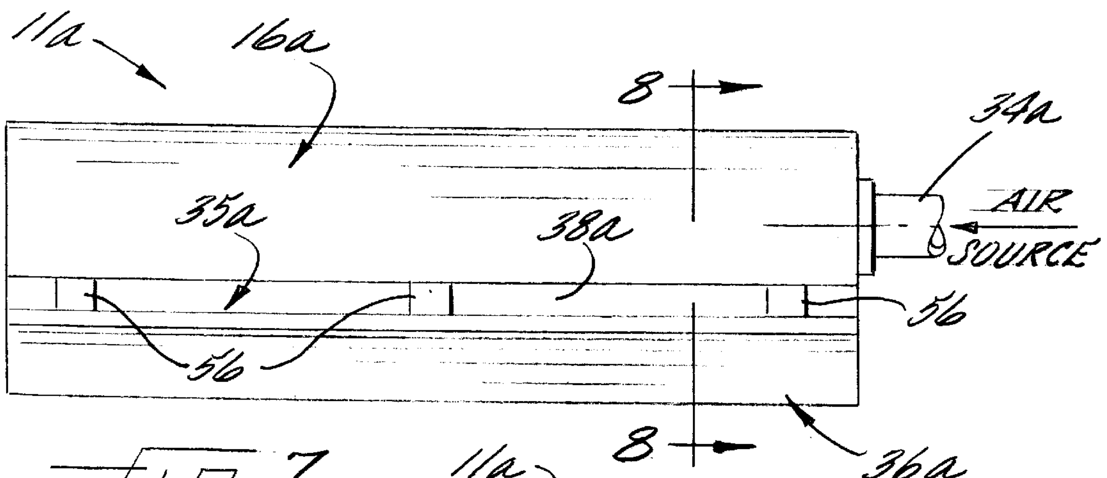
FIG. 7 is a side elevational view of an alternative embodiment of airknife embodying the invention.
Figure 8:
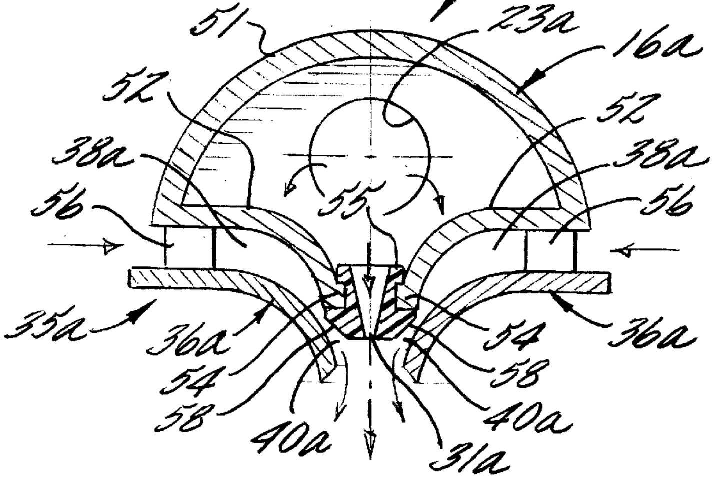
FIG. 8 is a vertical section of the airknife shown in FIG. 7, taken in the plane of line 8—8.

Referring now to FIGS. 7 and 8, there is shown an alternative embodiment of airknife according to the invention wherein items similar to those described above have been given similar reference numerals with the distinguishing suffix "a" added. The airknife 11*a* has a housing 16*a* in the form of an extrusion having a radiused upper wall 51 and a pair of inwardly radiused lower walls 52 which terminate in a pair of inwardly parallel flanges 54 extending the length of the housing 16*a*. A primary elongated air discharge orifice 31*a* in this case is defined by an orifice insert 55 supported between the spaced housing flanges 54.

For augmenting the air flow from the primary discharge orifice 31*a* the airknife 11*a* has a shroud 35*a* in the form of a pair of curved wings 36*a* supported by standoffs 56 in generally parallel relation to the inwardly curved housing side walls 52 so as to define auxiliary air passages 38*a* which communicate from respective outer sides of the housing 16*a* radially inwardly and then downwardly through auxiliary discharge orifices 40*a* defined between lower curved side wall portions of the wings 36*a* and the primary orifice defining insert 55. The insert 55 in this instance has downward and inwardly tapered sides 58 disposed closely adjacent to the lower curved side wall portions of the wings. The wings 36*a* again encompass and extend a distance below the primary discharge orifice 31*a* such that an air flow stream discharging from the primary discharge orifice 31*a* creates a low atmospheric pressure immediately downstream of the auxiliary discharge orifices 40*a* for drawing air through the auxiliary air passages and discharge orifices 38*a* to augment the air flow emitting from the primary discharge orifice 31, as described above. Again, the faces of the insert 55 and shroud 36*a* that define the primary and auxiliary discharge orifices 31*a,* 40*a* may be textured for reducing eddy current air drag.

Figure 2:
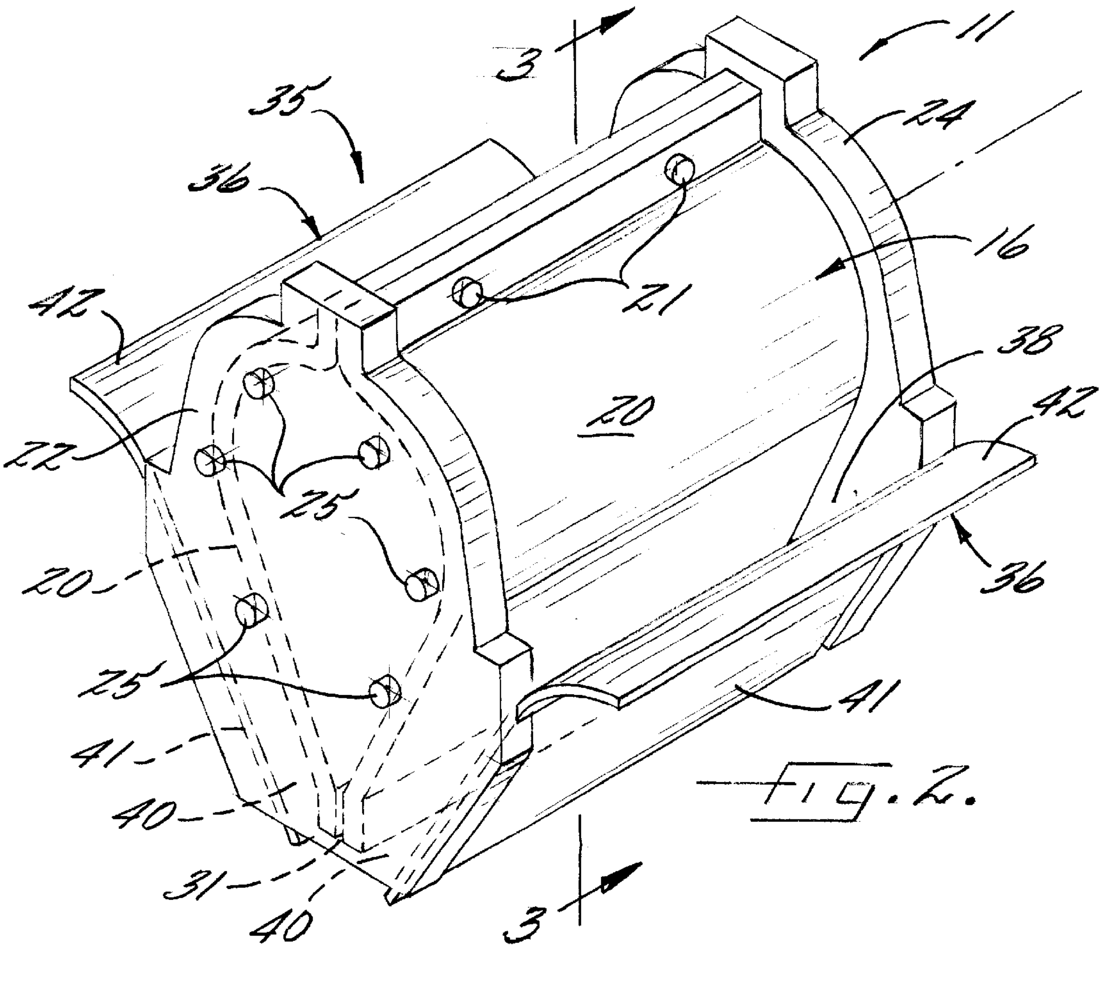
FIG. 2 is an enlarged perspective of the airknife shown in FIG. 1.
Figure 9A:
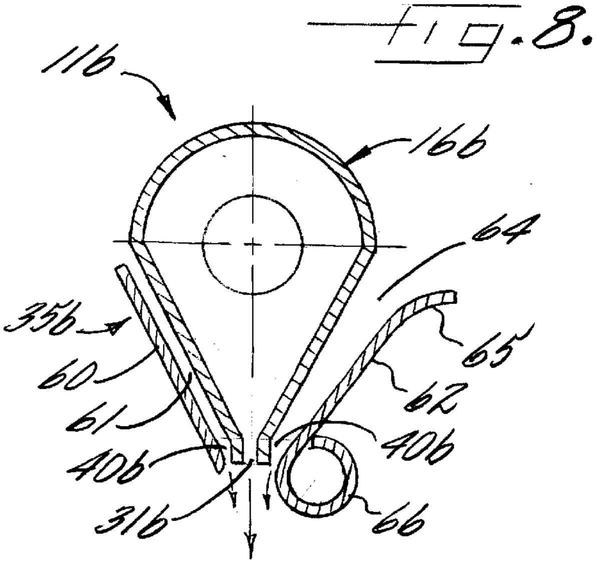
FIG. 9A is a vertical section of still another alternative embodiment of airknife according to the invention.
Figure 9B:
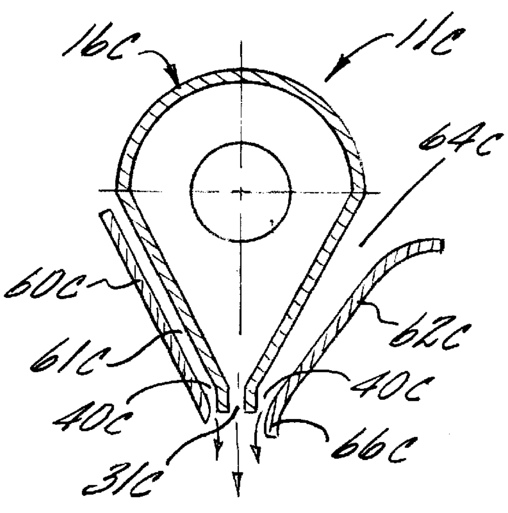
FIG. 9B is a vertical section of an airknife, similar to that shown in FIG. 9A, but depicting an alternative form of air augmenting shroud for the airknife.

Referring now to FIGS. 9A and 9B, airknives are depicted that have alternative shroud configurations that may be used with the airknife housing shown in the FIGS. 1–3 embodiment for effecting greater auxiliary air flow on one side of the primary discharge orifice than on the other side. With reference to FIG. 9A, an airknife 11*b* is shown which has a housing 16*b* similar to that previously described, and a shroud 35*b* which comprises a substantially straight wing 60 generally parallel with a straight downwardly tapered lower end of the airknife housing 16*b* for defining a substantially uniform width auxiliary air passage 61 and a second wing 62 disposed at an acute angle to the other side of the housing 16*b* for defining an auxiliary air passage 64 that converges in a downward direction toward a respective auxiliary discharge orifice 40*b*. The shroud wing 62 has an outwardly flared upper end 65 and a cylindrical lower end 66 which, together with the airknife housing 16*a,* defines the auxiliary discharge orifice 40*b* on one side of the primary discharge orifice 31*b* and which extends below the wing 61 on the opposite side of the housing 16*b*. The larger auxiliary air passage 64 defined by the angled wing 62 enables a greater auxiliary air flow on one side of the air curtain than on the opposite side and the lower terminal end 66 of the wing 62 directs that auxiliary air flow for a greater distance than the relatively shorter wing 60. With reference to FIG. 9B, the airknife 11*c* is similar to that shown in FIG. 9A, except that an angled wing 62*c,* which extends below the level of a parallel wing 60*c,* terminates with a curved lower end 66*c*.

Figure 10:
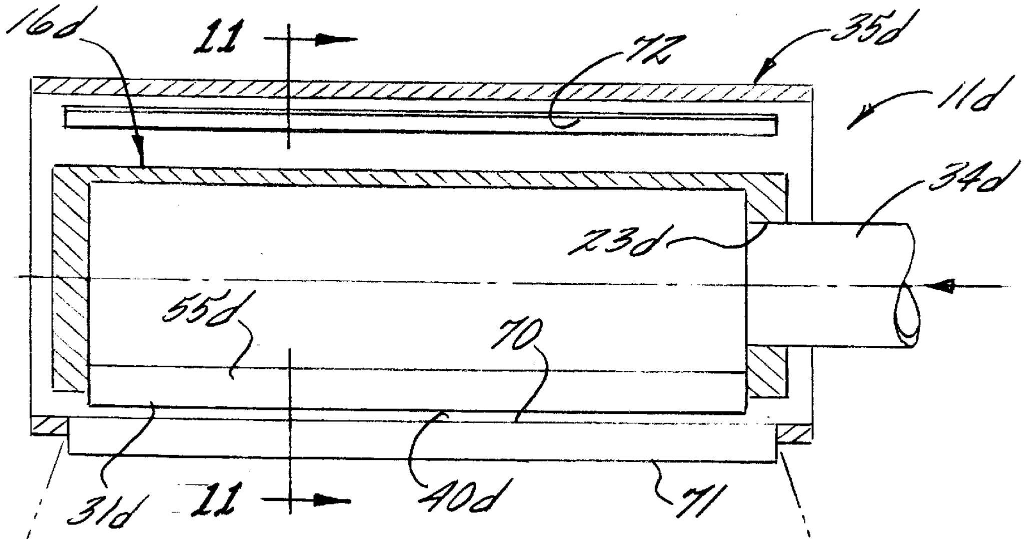
FIG. 10 is a longitudinal section of still a further alternative embodiment of airknife according to the invention.
Figure 11:
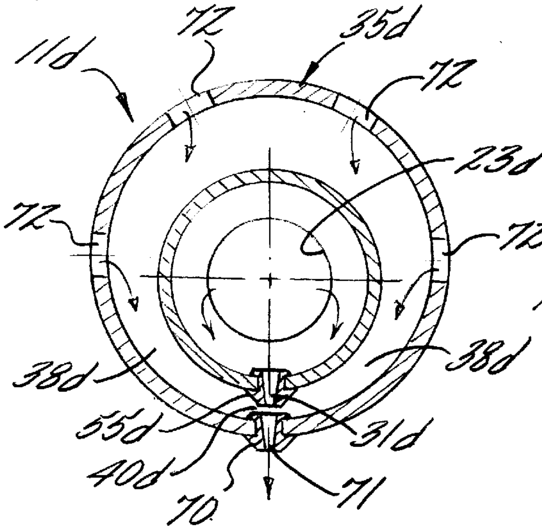
FIG. 11 is a vertical section of the airknife shown in FIG. 10 taken in the plane of line 11—11.

With reference to FIGS. 10 and 11, there is shown still a further alternative embodiment of airknife according to the invention, wherein items similar to those described above have been given similar reference numerals with the distinguishing suffix "d" added. In this case, an airknife 11*d* is provided that has a cylindrical housing 16*d* with an air inlet 35*d* at one axial end thereof and a longitudinally extending insert 55*d* mounted in the bottom of the housing 16*d,* which defines an elongated primary air discharge orifice 31*d*. An air augmenting shroud 35*d* in this instance is defined by a cylindrical member which encompasses the airknife housing 16*d* and has a longitudinal insert 70 in a bottom side that defines a final elongated air discharge orifice 71 in closely spaced and aligned relation to the primary discharge orifice 31*b* of the housing. Upstream and downstream ends of the inserts 55*d,* 70 define elongated auxiliary orifices 40*d* which communicate between the final discharge orifice 71 and auxiliary air passages 38*d* defined between the cylindrical side walls of the housing 16*d* and shroud 35*d* which in turn communicate with circumferentially spaced air inlet passages 72 in the shroud 35*d*.

In operation of the airknife 11*d,* low pressure air introduced into the airknife housing 16*d* through the inlet 35*d* discharges through the elongated primary discharge orifice 31*d* directly into the final elongated discharge orifice 71 defined by the shroud insert 70, creating a low pressure condition in the vicinity of the auxiliary air orifices 40*d* defined between the inserts 55*d,* 70. This low pressure zone causes an augmenting air flow to be drawn through the auxiliary air passages 38*d* defined between the cylindrical housing 16*d* and shroud 35*d* thereby increasing the volume and velocity of the air curtain discharging from the final elongated discharge orifice 71.

Figure 12:
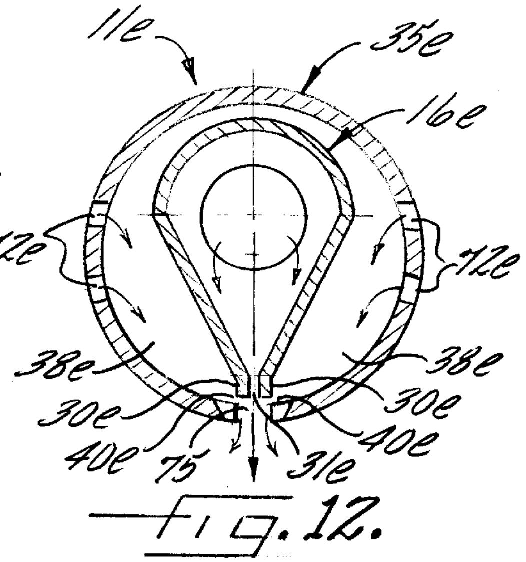
FIG. 12 is a vertical section, similar to FIG. 11, but showing still a further alternative embodiment of airknife according to the invention.

With reference to FIG. 12, a further alternative embodiment of airknife 11*a* is disclosed which comprises a pear-shaped airknife housing 16*e,* similar to that disclosed in FIGS. 1–3, having a cylindrical shroud 35*e* generally similar to that shown in FIGS. 10 and 11. An elongated primary discharge orifice 31*e* defined between lower terminal flanges 30*e* of the housing 16*e* in this case discharges air through an elongated relatively narrow width longitudinal opening 75 in the shroud 35*e* disposed immediately below the primary orifice defining flanges 30*e*. Longitudinal edges of the opening 75 and terminal ends of the housing flanges 30*e* define elongated auxiliary air discharge orifices 40*e* which communicate with auxiliary air passages 38*e* defined by the space between the housing 16*e* and shroud 35*e,* which in turn communicate with air inlet passages 72*e* in the shroud. Again, air discharging from the primary discharge orifice 31*e* will create a low pressure condition within the elongated shroud opening 75, in turn causing an augmenting air flow through the auxiliary discharge orifices 40*e*.

Figure 13:
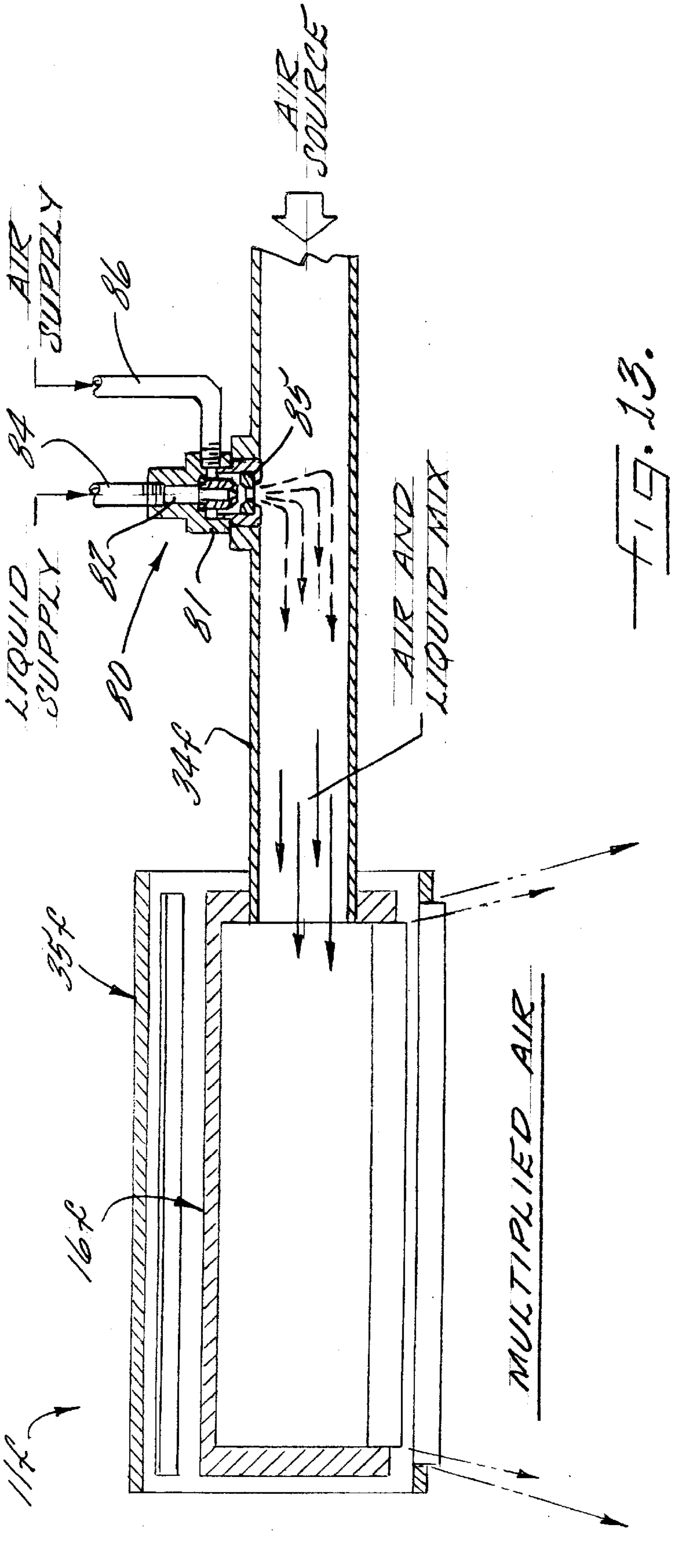
FIG. 13 is a partially diagrammatic depiction of an alternative embodiment of airknife adapted for the low-pressure application of a curtain of air-laden particles.

In accordance with a further aspect of the invention, the airknife of the present invention may be used for the low pressure direction and application of air laden particles. To this end, with reference to FIG. 13, there is shown an airknife 11*f* having a housing 16*f* and shroud 35*f* similar to that shown in FIGS. 10 and 11. The airknife 11*f* in this instance has a liquid atomizer 80 operable for directing atomized liquid droplets into a blower directed air stream passing through the inlet conduit 34*f* and communicating with the airknife housing 16*f*. The atomizer 80, which may be of a conventional type, comprises a nozzle body 81 having an axial liquid flow passage 82 connected at its upstream end with a liquid supply line 84 and having a mixing nozzle 85 adjacent a downstream end. Pressurized air from an air supply line 86 communicates radially with liquid passing through the nozzle 85 for atomizing the liquid into fine droplets, prior to radial introduction into the air inlet conduit 34*f*. The preatomized liquid droplets will be carried by the air stream directed into the airknife housing 16*f* and will discharge with the air curtain, for low pressure application onto a substrate or items being conveyed through the air curtain, or for discharge into the atmosphere. The air augmenting shroud 35*f* again enhances the reliable direction and application of the air laden particles, notwithstanding the relatively low pressure air supply.

From the foregoing, it can be seen that blower-operated airknife of the present invention is adapted for more efficient operation, enabling greater air flow for a given air inlet pressure. The airknife is adapted for producing a higher volume and/or velocity air current without increasing the size or operating pressure of the associated blower and discharges a curtain of air having a greater effective transverse width. The air curtain further is adapted for the reliable, low pressure direction and application of air laden particles, such as preatomized liquid particles.

What is claimed is:

1. An airknife apparatus for directing a curtain of air comprising:

a housing having an air inlet, a blower for supplying pressurized air into said housing through said inlet, said housing having an elongated primary air discharge orifice through which pressurized air supplied to said housing is emitted in an elongated air curtain, a shroud for defining at least one auxiliary air passage communicating at one end with ambient air outside said housing and at an opposite with an auxiliary air discharge orifice disposed in adjacent relation to said primary discharge orifice such that air discharging from said primary discharge orifice creates a low pressure condition adjacent said auxiliary air discharge orifice which draws air through said auxiliary passage and auxiliary discharge orifice augmenting the air flow emitted from said primary discharge orifice.

2. The airknife apparatus of claim 1 in which said auxiliary air discharge orifice extends in parallel closely spaced relation to said primary discharge orifice.

3. The airknife apparatus of claim 1 in which said shroud defines auxiliary air passages and elongated auxiliary discharge orifices on opposite longitudinal sides of said primary discharge orifice.

4. The airknife apparatus of claim 3 in which said blower supplies pressurized air at a pressure of less than 10 psi.

5. The airknife apparatus of claim 3 in which said shroud extends below and on opposite sides of said primary discharge orifice.

6. The airknife apparatus of claim 3 in which said auxiliary air discharge orifices each has a width greater than the width of the primary discharge air discharge orifice.

7. The airknife apparatus of claim 3 in which said shroud defines a larger auxiliary air flow passage on one side of said primary discharge orifice than on the other side thereof.

8. The airknife apparatus of claim 7 in which said larger air flow passage is tapered inwardly in an air flow direction toward said auxiliary discharge orifice.

9. An airknife apparatus for directing a curtain of air comprising:

a housing having an air inlet, a blower for supplying pressurized air into said housing through said inlet, said housing having an elongated primary air discharge orifice through which pressurized air supplied to said housing is emitted in an elongated air curtain, a shroud for defining at least one auxiliary air passage communicating with an auxiliary air discharge orifice disposed in adjacent relation to said primary discharge orifice such that air discharging from said primary discharge orifice creates a low pressure condition adjacent said auxiliary air discharge orifice which draws air through said auxiliary passage and auxiliary discharge orifice augmenting the air flow emitted from said primary discharge orifice, and said primary and auxiliary discharge orifices each being defined by a pair of opposing faces, said opposing faces each have an irregular surface configuration.

10. The airknife of claim 9 in which said irregular surface configuration of said opposing orifice-defining faces are in the form of closely spaced riblets extending parallel to a direction of air flow through said discharge orifices.

11. The airknife apparatus of claim 9 in which said irregular surface configuration of said opposing orifice-defining faces comprise dimples.

12. The airknife apparatus of claim 3 in which said housing includes a pair of plate portions with faces that define said primary discharge orifice, and said plate portions and shroud have opposing faces that define said auxiliary discharge orifices.

13. The airknife apparatus of claim 3 in which said housing has a pear-shaped configuration with a downwardly and inwardly tapered lower portion which define said primary discharge orifice.

14. The airknife apparatus of claim 3 in which said shroud comprises a pair of wings, said wings each being mounted in spaced relation to a respective side of said housing for defining a respective auxiliary air passage adjacent a side of the housing.

15. The airknife apparatus of claim 14 in which said wings extend below said primary discharge orifice.

16. The airknife apparatus of claim 15 in which one of said wings extends below the primary discharge orifice a distance greater than the other of said wings.

17. The airknife apparatus of claim 14 in which said housing comprises a pair of side panels and a pair of end panels, and said wings being supported in outwardly spaced relation to said side panels for defining said auxiliary passages therebetween.

18. The airknife apparatus of claim 14 in which one of said wings is oriented at an angle to said housing different from the other of said wings for defining a different sized and configured auxiliary air passage than the other wing defines with said housing.

19. The airknife apparatus of claim 14 in which said wings have upwardly and outwardly curved upper portions.

20. The airknife apparatus of claim 3 in which said shroud has a cylindrical configuration with an elongated opening in aligned relation to the primary discharge orifice of said housing such that air emitted from said primary discharge orifice is directed into and through the elongated shroud opening.

21. The airknife apparatus of claim 3 in which said primary discharge orifice is defined by a longitudinally extending orifice insert in the bottom of said housing, and said shroud has a longitudinal extending orifice defining insert disposed in aligned closely spaced adjacent relation to said housing insert such that air emitted from said primary discharge orifice is directed into and through the orifice defined by said shroud insert.

22. The airknife apparatus of claim 3 in which upper and lower sides of said shroud insert and housing insert, respectively, define said auxiliary discharge orifices which communicate with the orifice defined by said shroud insert.

23. The airknife apparatus of claim 1 including an inlet conduit for directing pressurized air from said blower to said housing inlet, and a dispensing device for directing particulate matter into said inlet conduit for travel with air supplied to said housing and direction from said airknife housing with said air curtain.

24. A processing apparatus comprising:

a conveyor for moving items to be processed along a path of travel, an airknife for directing an elongated curtain of air transverse to said path of travel of items to be processed, said airknife including a housing having an air inlet, a blower for supplying pressurized air into said housing through said inlet, said housing having an elongated primary air discharge orifice through which pressurized air supplied to said housing is emitted in an elongated air curtain, a shroud for defining at least one elongated auxiliary air passage communicating at one end with ambient outside said housing and at an opposite end with an auxiliary air discharge orifice disposed in adjacent relation to said primary discharge orifice such that air discharging from said primary discharge orifice creates a low pressure condition adjacent said auxiliary air discharge orifice which draws air through said auxiliary discharge orifice augmenting the air flow emitted from said primary discharge orifice.

25. The processing apparatus of claim 24 in which said shroud defines elongated auxiliary discharge orifices on opposite longitudinal sides of said primary discharge orifice.

26. The processing apparatus of claim 25 in which said shroud extends below and on opposite sides of said primary discharge orifice, and said auxiliary air discharge orifices each has a width greater than the width of the primary discharge air discharge orifice.

27. The processing apparatus of claim 25 in which said primary and auxiliary discharge orifices each are defined by a pair of opposing faces, said opposing faces each have an irregular surface configuration.

28. The processing apparatus of claim 24 including an inlet conduit for directing pressurized air from said blower to said housing inlet, and a dispensing device for directing particulate matter into said inlet conduit for travel with air supplied to said housing and direction from said airknife housing with said air curtain.

29. The airknife of claim 9 in which said irregular surface configuration of said orifice-defining faces comprise a patterned configuration.

30. An airknife apparatus for directing a curtain of air comprising:

a housing having an air inlet, a blower for supplying pressurized air into said housing through said inlet, an inlet conduit for directing pressurized air supplied to said inlet, said housing having an elongated primary air discharge orifice through which pressurized air supplied to said housing is emitted in an elongated air curtain, a liquid atomizer having a liquid supply and pressurized air supply, said atomizer being operable for preatomizing liquid into liquid particles and directing the atomized liquid into said inlet conduit for travel with air supplied to said housing and for direction from said airknife housing with said air curtain, a shroud for defining at least one auxiliary air passage communicating with an auxiliary air discharge orifice disposed in adjacent relation to said primary discharge orifice such that air discharging from said primary discharge orifice creates a low pressure condition adjacent said auxiliary air discharge orifice which draws air through said auxiliary passage and auxiliary discharge orifice augmenting the air flow emitted from said primary discharge orifice.

* * * * *